United States Patent [19]

Lieser

[11] Patent Number: 4,883,392
[45] Date of Patent: Nov. 28, 1989

[54] FLY-CUTTER MILLING MACHINE

[75] Inventor: Karl Lieser, Wuppertal, Fed. Rep. of Germany

[73] Assignee: Wera Werk Hermann Werner GmbH & Co., Wuppertal, Fed. Rep. of Germany

[21] Appl. No.: 193,875

[22] Filed: May 13, 1988

[30] Foreign Application Priority Data

May 30, 1987 [DE] Fed. Rep. of Germany ....... 3718261

[51] Int. Cl.$^4$ .............................................. B23C 3/04
[52] U.S. Cl. ..................................... 409/165; 409/18
[58] Field of Search ................... 405/64, 65, 131, 132, 405/165, 166, 168, 71, 80; 82/18, 19, 2 E, 1.2

[56] References Cited

U.S. PATENT DOCUMENTS

| 3,715,956 | 2/1973 | Lieser | 409/165 |
| 3,742,815 | 7/1973 | Sukhov et al. | 409/132 |
| 4,141,278 | 2/1979 | Lieser | 82/18 |
| 4,164,891 | 8/1979 | Lieser | 409/165 |
| 4,606,684 | 8/1986 | Shaturov et al. | 409/132 |
| 4,692,989 | 9/1987 | Neubaver | 29/558 |

FOREIGN PATENT DOCUMENTS

| 97346 | 2/1984 | European Pat. Off. . | |
| 58174 | 12/1890 | Fed. Rep. of Germany . | |
| 911689 | 8/1954 | Fed. Rep. of Germany | 82/18 |
| 1921514 | 10/1970 | Fed. Rep. of Germany | 409/132 |
| 2703399 | 8/1978 | Fed. Rep. of Germany | 409/132 |
| 3410575 | 10/1985 | Fed. Rep. of Germany . | |
| 3424494 | 1/1986 | Fed. Rep. of Germany . | |
| 862890 | 3/1941 | France . | |
| 90202 | 7/1980 | Japan | 82/18 |
| 157415 | 12/1980 | Japan | 409/132 |
| 450657 | 11/1974 | U.S.S.R. | 409/165 |
| 738771 | 6/1980 | U.S.S.R. | 82/18 |
| 944790 | 7/1982 | U.S.S.R. . | |
| 946804 | 8/1982 | U.S.S.R. | 82/18 |
| 1034839 | 8/1983 | U.S.S.R. | 409/165 |
| 1181778 | 9/1985 | U.S.S.R. | 409/165 |
| 2065012 | 6/1981 | United Kingdom . | |
| WO85/00545 | 7/1984 | World Int. Prop. O. . | |

Primary Examiner—William Briggs
Attorney, Agent, or Firm—Martin A. Farber

[57] ABSTRACT

A fly-cutter milling machine for the simultaneous milling of a plurality of profiled structures developed in the form of grooves, surfaces or the like in rotating workpieces by means of a fly cutter which protrudes radially outward on a rotating tool holder and which plunges through the cross section of the workpiece with a speed corresponding to the conditions of the fly-cutting, the speeds of rotation of tool holder and workpiece being in a ratio determined by the desired profiled structure, and in order to increase the range of use of the fly-cutter milling machine, the speed of rotation of the fly cutter over the emerged path differs from that over the plunge path.

4 Claims, 2 Drawing Sheets

4,883,392

FLY-CUTTER MILLING MACHINE

FIELD AND BACKGROUND OF THE INVENTION

The present invention relates to a fly-cutter milling machine for the simultaneous milling of a plurality of profiled structures developed in the form of grooves, surfaces or the like in rotating workpieces (7) by means of a fly cutter (10) which protrudes radially outwards on a rotating tool holder and which plunges through the cross section of the workpiece with a speed corresponding to the condition of the fly-cutting, the speeds of rotation of tool holder and workpiece being in a ratio determined by the desired profiled structure.

Such a fly-cutter milling machine is known from U.S. Pat. No. 4,141,278, the axis of rotation of the workpiece and the axis of the tool holder being arranged axially parallel to each other. In order, for instance, to be able to mill a quadratic polygon on a cylindrical workpiece, the tool holder must be provided with two diametrically opposite outwardly protruding fly cutters. Each of these fly cutters then cuts two polygonal surfaces of the polygon which are parallel to each other. In order that these surfaces are not barreled but flat, a speed rotation ratio between the tool holder and the workpiece of 2:1 is necessary. A hexagon similarly requires three fly-cutters arranged at equal circumferential distances apart on the tool holder. As a result of this step-up ratio of 2:1 it is not possible to produce a polygon having an odd number of corners unless the speed ratio is changed and a barreled surface is tolerated. Thus only surfaces which are parallel to each other can be worked by a single fly-cutter into a cylindrical workpiece. In order that the fly cutter milling machine operate economically, it is necessary to work with high speeds of rotation. However this is limited by the nature of the fly cutter itself.

A fly cutter milling machine is also known from Federal Republic of Germany OS 1 921 514, the tool holder axis and the workpiece axis of rotation being arranged at right angles and skew to each other. In this way it is possible to produce grooves spaced equally apart on the periphery on the workpiece with high cutting speed without use of a coolant, due to the free-cutting of the tool cutting edge. In this case the grooves extend in the axial direction of the workpiece. Helical grooves cannot be produced with this flycutter milling machine. By the free-cutting, the grooves are somewhat enlarged in their cross sectional shape as compared with the cutting profile of the fly cutter.

SUMMARY OF THE INVENTION

The object of the present invention is to broaden the field of use of a fly-cutter milling machine of the above indicated type.

This is achieved, in accordance with one embodiment of the invention by incorporating into the type of machine set forth above the inventive features wherein the speed of rotation of the fly cutter is different over the emerged path than over the plunge path.

A further feature of the invention is the fact that the speed of rotation of the fly cutter over the emerged path is greater than that over the plunge path.

As a result of this development, a fly-cutter milling machine of this type which is of increased utility is created. The field of use of the fly-cutter milling machine is broadened as compared with the known designs. In addition to the customary production of serrated shaft profiles, notch profiles, Hirth-type serrations, spline-shaft profiles, special profiles and polygons, other milling operations can be carried out. Furthermore it is possible to produce a polygon having an odd number of corners with flat surfaces. This is done by means of controlling the speed of rotation of the fly cutter. If the latter, plunges into a work piece for the production, for instance, of polygonal surfaces, the speed ratio between the tool holder and the workpiece is 2:1. As soon as the fly cutter emerges it travels with a different speed of rotation and then, upon the next plunge into the workpiece, passes through it with the predetermined speed of rotation. In this way it is possible with a single fly cutter to produce, for instance, a triangle which cannot be done with the prior-act machines. Furthermore, the tool holder can be provided with several fly cutters, thus increasing the output of the milling machine. In this way, even helically extending grooves can be produced on the workpiece, the axis of rotation of the workpiece and the axis of the tool holder being capable of being brought into corresponding alignment with each other. By adapted speed of rotation of the fly cutter over the plunge path with respect to the workpiece which is rotating with constant speed of rotation, the helical groove is then produced. A considerable increase in economy is obtained in the manner that the fly cutter, during its cutting phase, rotates with the customary speed which results from the cutting conditions and then, after its emergence, as a result of acceleration, travels over its flight path with increased speed of rotation. Shortly before the renewed plunge into the workpiece, deceleration to the predetermined cutting speed then takes place.

The object of the invention is achieved in accordance with another embodiment of the invention in the manner that the rotation of the workpiece is briefly interrupted at the time of the maximum depth of plunge of the fly cutter by a stop position of the workpiece. This reversal makes it possible, despite change of the parameters of the tool cutting edge which determine the groove profile, to produce precisely adapted grooves on the workpiece. As long as the fly cutter has still not reached its maximum depth of plunge, the free-cutting takes place. At the moment of the maximum depth of plunge the rotary movement of the workpiece is, however, interrupted for a short time while the fly cutter continues to travel and thereby produces the groove profile which is precisely adapted in shape to its cutting-edge profile. The brief reduction/termination of the rotary movement of the workpiece possibly up to the stop position does not, in this connection, impair the speed ratio between workpiece and fly cutter but increases the possibilities of milling practically any desired shapes down to normal letters. When the fly cutter leaves the greatest depth of plunge, the rotation of the workpiece is increased again. Distortion of the groove profile does not then take place despite the further free cutting. The greatest depth of penetration of the fly cutter is present when it is in the 90° plunge position of the groove. This density of shape between the groove profile and the tool cutting edge is obtained without having to use the complicated undercut fly cutters which would otherwise be necessary. The regrinding of the fly cutters is thus simplified. Furthermore, longer lives of the cutting edge of the tools can be expected.

BRIEF DESCRIPTION OF THE DRAWINGS

Present invention will become more clearly understood in connection with the detailed description of a preferred embodiment, when considered with the accompanying drawings, of which.

DETAILED DESCRIPTION OF THE PREFERRED EMBODIMENT

The fly-cutter milling machine has a pedestal stand 1 within which a drive (not shown) is arranged. On the pedestal 1 there is a switchboard 2 with the corresponding selection switches and control displays.

Figure 2:
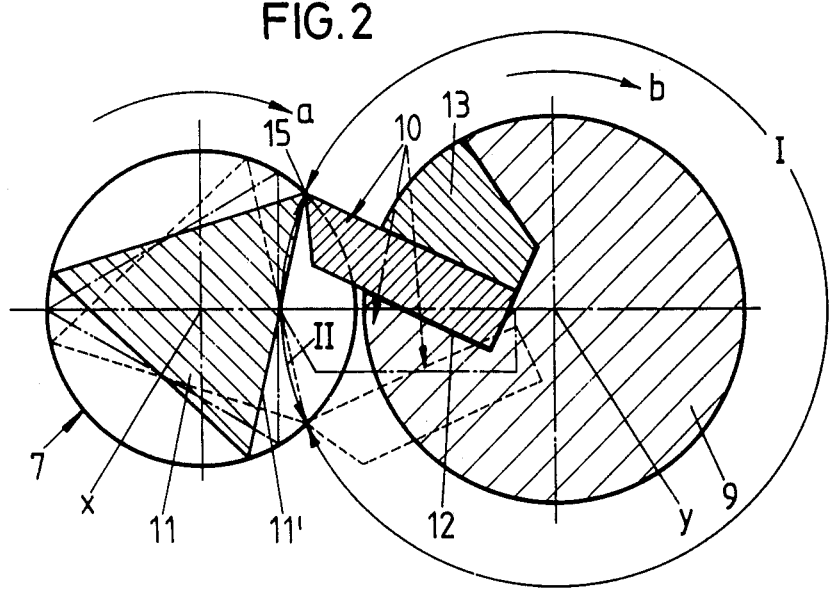
FIG. 2 is a cross section through the tool holder and workpiece during the milling of a triangle on a cylindrical workpiece.
Figure 3:
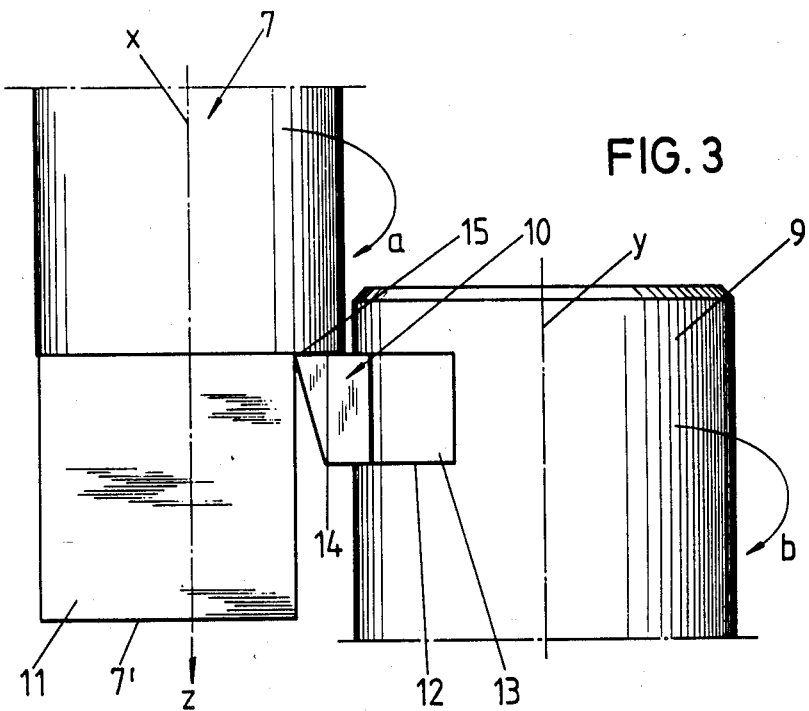
FIG. 3 is a top view of FIG. 2.

The pedestal 1 is provided on top with a slide 3 which is guided in the longitudinal direction of the machine. On the slide 3 there is a transverse slideway 4 for a slide rest 5 which is the holder of a chuck 6 which can be driven around a horizontal axis of rotation x (FIGS. 2, 3). Workpieces 7 can be clamped in centered position in said chuck.

Opposite the slide rest 5 there is a head 8 which extends from the pedestal 1 and in which a tool holder 9, which can be driven with a different speed of rotation, is mounted. The tool hoder axis y extends parallel to the workpiece axis of rotation x.

This position is selected if a polygon 11 is to be produced on the cylindrical workpiece 7 by means of a fly cutter 10 which protrudes radially outward on the rotating tool holder 9. The axes x, y lie in a common horizontal plane.

The fly cutter 10 is inserted in an insertion shaft 12 of the tool holder 9 and is clamped, free of vibration, by a clamping jaw 13. By its portion which protrudes beyond the tool holder 9, the fly cutter 10 forms the cutting flank 14 which, in accordance with FIG. 3, is directed radially to the holder axis y.

FIGS. 2 and 3 show that the direction of rotation a of the workpiece 7 is opposite the direction of rotation b of the tool holder 9.

Figure 1:
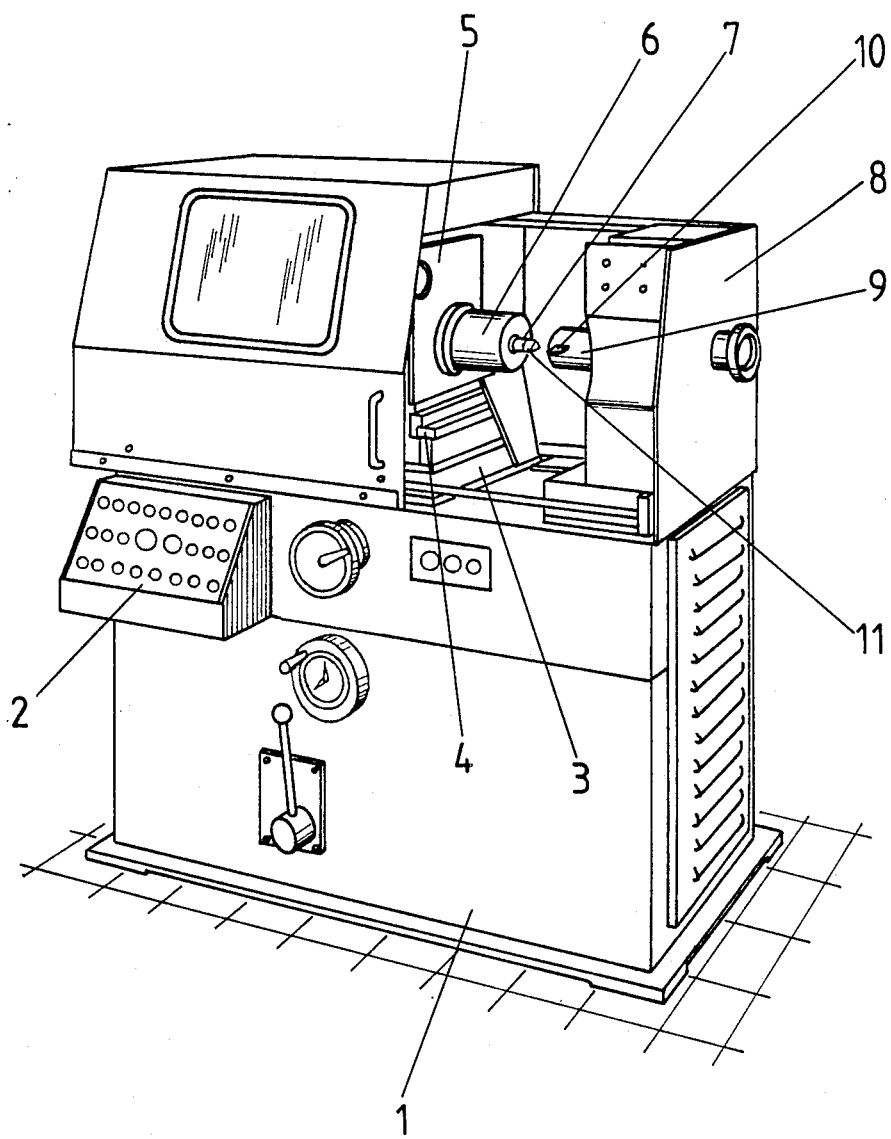
FIG. 1 is a view of a fly-cutter milling machine developed in accordance with the invention.

In order to produce a triangular polygon 11 on the cylindrical workpiece 7, the slide 3 is to be shifted into the position shown in FIG. 1 in such a manner that the tool holder 9 is located in front of the free face end 7' of the workpiece 7. The slide rest 5 is then shifted on the transverse slideway 4 so as to bring the axis of rotation x of the workpiece into a corresponding distance from the cutting tip 15. Chuck 6 and tool holder 9 are then placed in rotation with simultaneous lengthwise travel of the slide 3 in the direction indicated by the arrow z, the cutting flank 14 moving in the direction towards the front surface 7' of the workpiece 7. The workpiece 7 rotates with constant speed while the speed of rotation of the fly cutter 10 varies. In this way, the polygon 11 is produced on the workpiece 7.

In detail, the speed of rotation of the fly cutter 10 is greater over the emerged path I than over the plunged path II. During the plunged path II the speed of rotation corresponds to a speed ratio of 2:1 between tool holder 9 and workpiece 7, absolutely flat surfaces 11' being produced. In accordance with FIG. 2, the plunging fly cutter is indicated by dashed lines. In the position of the fly cutter shown in dot-dash line, it assumes its greatest depth of entry and then, upon further rotation, lies in the exit position of the fly cutter 10 shown in solid lines. After the emersion the speed of rotation suddenly increases. This speed is decelerated to the predetermined cutting speed shortly before the renewed plunging of the fly cutter into the workpiece. Upon the renewed plunge of the fly cutter 10, the adjacent triagonal surface is then produced or the corresponding chip removed for the production thereof.

Other variations with respect to the profile to be produced are possible in the manner that the direction from tool shaft to workpiece spindle is selected other than 90° or made adjustable.

A plurality of tool spindles which are at an angle to each other can also be provided on a machine, in accordance, for instance, with Federal Republic of Germany Patent Application P 32 40 165.5.

We claim:

1. A fly-cutter milling machine for the simultaneous milling of a plurality of profiled structures having the form of grooves, surfaces and the like in rotating workpieces, the machine comprising:

a drive means for rotating a workpiece;

a rotating tool holder, and a fly cutter which protrudes radially outwards on the rotating tool holder;

a drive means for operatively rotating the cutter; and control means connected to said cutter and workpiece drive means so that the cutter plunges via a plunge path through the cross section of the workpiece with a speed corresponding to the conditions of the fly-cutting, the cutter exiting the workpiece via an emerged path, speeds of rotation of tool holder and workpiece being in a ratio determined by a desired profiled structure, the speed of rotation of the fly cutter being different over the emerged path than over the plunge bath.

2. A fly-cutter milling machine according to claim 1, wherein the speed of rotation of the fly cutter over the emerged path is greater than that over the plunge path.

3. A fly-cutter milling machine for the simultaneous milling of a plurality of profiled structures having the form of grooves, surfaces and the like in rotating workpieces, the machine comprising:

a drive means for rotating a workpiece;

a rotating tool holder, and a fly cutter which protrudes radially outwards on the rotating tool holder;

a drive means for operatively rotating the cutter;

control means connected to said cutter and workpiece drive means so that the cutter plunges via a plunge path through the cross section of the workpiece with a speed corresponding to the conditions of the fly-cutting, the cutter exiting the workpiece via an emerged path, the speeds of rotation of tool holder and workpiece being in a ratio determined by a desired profiled structure, rotation of the workpiece being interrupted briefly at a time of a maximum depth of plunge of the fly cutter by a phase of reduced speed of the workpiece.

4. A fly-cutter milling machine according to claim 3, wherein the phase of reduced speed is attained by a stop position of the workpiece.

* * * * *